(12) United States Patent
Blanco et al.

(10) Patent No.: US 8,744,965 B2
(45) Date of Patent: Jun. 3, 2014

(54) FUND SHARING METHOD AND APPARATUS (75) Inventors: German Blanco, London (GB); Colin Tanner, Ickenham Uxbridge Middx (GB); Theresa Smith, St. Albans (GB)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/603,719

(22) Filed: Sep. 5, 2012

(65) Prior Publication Data
US 2014/0067667 A1 Mar. 6, 2014

(51) Int. Cl.
*G06Q 30/00* (2012.01)
*G06Q 40/00* (2012.01)

(52) U.S. Cl.
USPC .............................. 705/41; 705/38; 705/26.8

(58) Field of Classification Search
USPC .................................................. 705/26.8, 38
See application file for complete search history.

(56) References Cited

U.S. PATENT DOCUMENTS

| | | | |
|---|---|---|---|
| 2005/0086168 A1* | 4/2005 | Alvarez et al. | 705/41 |
| 2009/0327129 A1* | 12/2009 | Collas et al. | 705/41 |
| 2012/0197794 A1* | 8/2012 | Grigg et al. | 705/41 |

OTHER PUBLICATIONS

International Search Report and Written Opinion dated Sep. 30, 2013 from International Patent Application No. PCT/US13/58324, 10 pages.
Price, "Square Cash makes bill collecting from your friends less of a hassle," AOL Inc., 2014, accessed Feb. 14, 2014 online at http://www.engadget.com/2014/02/13/square-cash-requests/, 1 page.

* cited by examiner

*Primary Examiner* — William Rankins
(74) *Attorney, Agent, or Firm* — Duane Morris LLP (57) ABSTRACT

A system, method, and computer-readable storage medium configured to enable the pooling and sharing of funds to cover shared expenses. An electronic basket is created. The electronic basket includes a virtual prepaid payment card with a unique identifier and associated with a user. The user is prompted for potential contributors to the electronic basket. A network interface electronically contacts the potential contributors, and the electronic basket is stored in a user-card database.

21 Claims, 6 Drawing Sheets

FUND SHARING METHOD AND APPARATUS

BACKGROUND

1. Field of the Invention

Aspects of the disclosure relate in general to financial services. Aspects include an apparatus, system, method and computer-readable storage medium to enable the pooling and sharing of funds to cover shared expenses.

2. Description of the Related Art

When individuals have shared expenses, a dilemma of funding the shared expenses is created.

In some instances, multiple individuals can pay a single bill by using multiple individual payment cards. For example, when a group of individuals go out to dinner at a restaurant, each person may present a payment card. As this creates an additional burden on the restaurant, many restaurants limit the number of payment cards that can be presented with a bill. Additionally, the fairness of the restaurant scenario is in question when people order entrees of different costs, as restaurants usually evenly divide the bill among payers.

Figure 6:
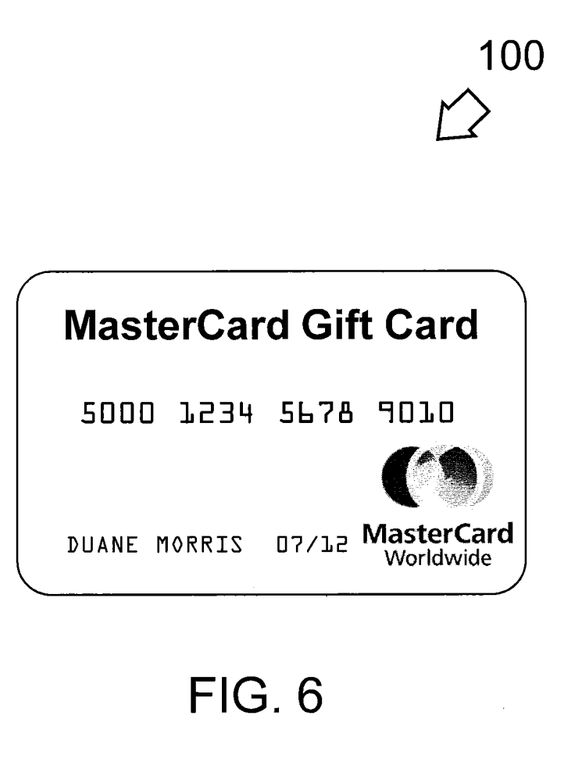
FIG. 6 illustrates an example payment card.

Even worse, many vendors such as department stores, supermarkets, "big box" stores or gas stations will not accept multiple payment cards for a single transaction. In these instances, usually one person receives cash from their cohorts and then pays the vendor directly with the cash or a payment card, such as a prepaid gift card 100 as shown in FIG. 6.

More complex is when multiple individuals are paying for different expenses for a joint project. For example, if a number of people are going on a camping trip, one person may be assigned to buy groceries, another to buy camping gear, and yet another person may have to pay for gas and miscellaneous items. Keeping track of total expenses and evenly funding the enterprise becomes a logistical nightmare.

SUMMARY

Embodiments include a system, device, method and computer-readable medium to enable the pooling and sharing of funds to cover expenses. An electronic basket is created. The electronic basket includes a virtual prepaid payment card with a unique identifier and associated with a user. The user is prompted for potential contributors to the electronic basket. A network interface electronically contacts the potential contributors, and the electronic basket is stored in a user-card database.

DETAILED DESCRIPTION

One aspect of the disclosure includes the realization that card holders may be able to pool their funds in real-time. Embodiments enable users to dynamically pool and share funds to cover joint expenses. Conceptually, a basket is a virtual payment card or electronic wallet, which can be funded by contributors. The creator of the basket is authorized to make payments using contributed funds within the basket. The basket creator may also nominate and authorize others to make payments with the funds pooled within the basket.

By using a basket, contributors can more fairly allocate expenses. By facilitating multiple payers from a basket, collaborators can more easily share common funds. Moreover, users can make payments to multiple vendors while still keeping track of their shared expenses.

In another aspect of the disclosure, embodiments notify and keep contributors informed on payments made their behalf with the contributed funds.

These and other benefits may be apparent in hindsight to one of ordinary skill in the art.

Embodiments of the present disclosure include a system, method, and computer-readable storage medium configured to pool and share funds to cover joint expenses.

Figure 1:
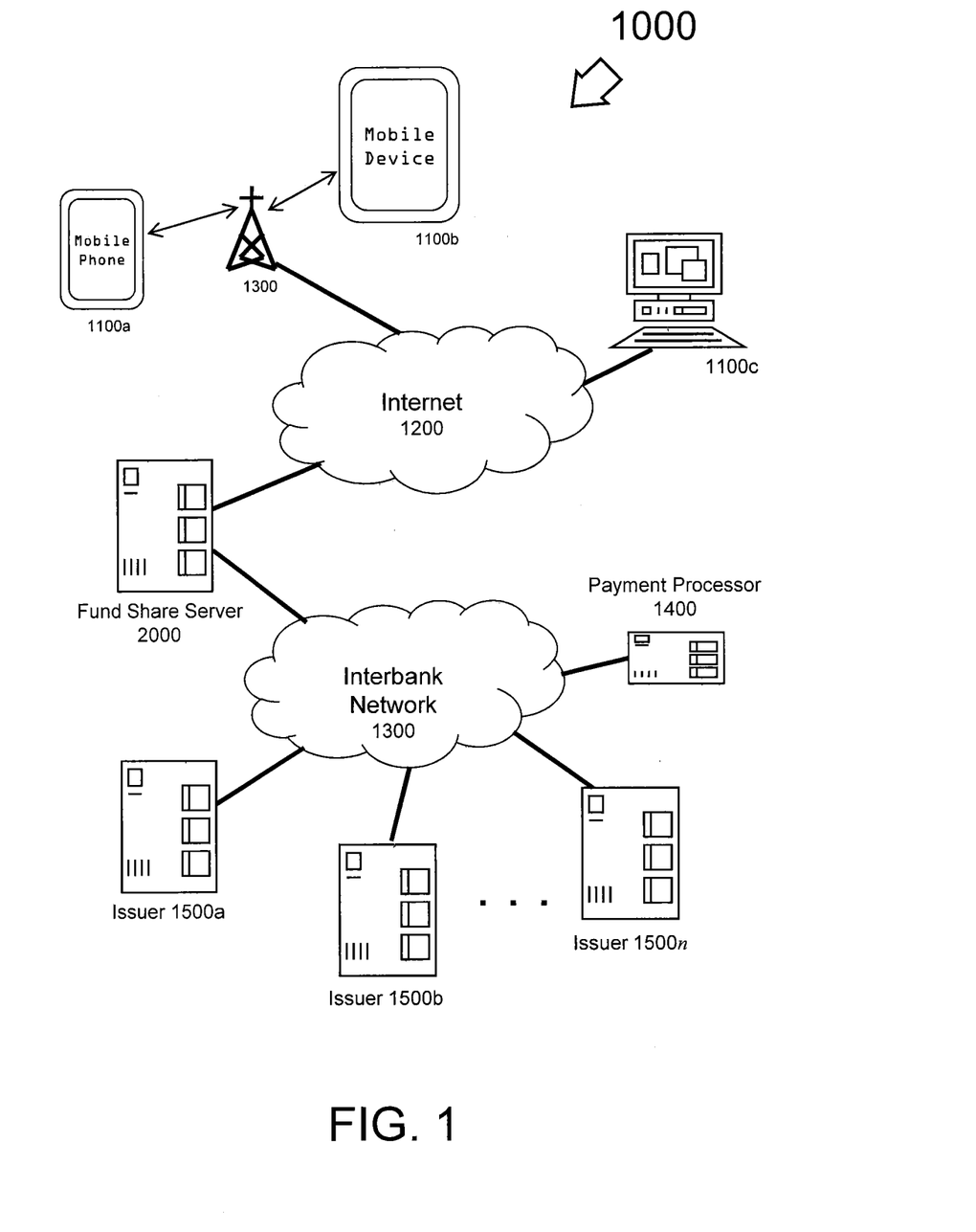
FIG. 1 illustrates an embodiment of a system configured to enable the pooling and sharing of funds to cover expenses.

FIG. 1 illustrates an embodiment of a system 1000 configured to enable the pooling and sharing of funds to cover expenses, constructed and operative in accordance with an embodiment of the present disclosure. System 1000 includes consumers using a plurality of computing devices 1100*a-c* to connect to a fund share server 2000 via a data network 1200, such as the Internet. Details and example uses of fund share server 2000 are discussed below.

In some embodiments, consumers may use a mobile phone 1100*a*, mobile device 1100*b*, or personal computer 1100*c* and connect to fund share server 2000 via a wireless data network 1300 capable of connecting to the Internet. It is understood that wireless data network 1300 may be a wireless data provider such as a cellular telephone network, wireless local area network (WLAN or "WiFi networks"), satellite data networks, and the like. Computing devices 1100 include mobile devices such as mobile telephones, tablet computers, laptop computers, "ultra books" or other portable computing device known in the art capable of communicating to fund share server 2000.

As shown in FIG. 1, fund share server 2000 may be connected to payment processor 1400 and issuers 1500*a-n* via an interbank network. In some embodiments, fund share server 2000 may be located at payment processor 1400 or at an issuer 1500.

Payment processor 1400 is a payment network capable of processing payments electronically. An example payment processor 1400 includes MasterCard International Incorporated.

Issuers 1500*a-n* include any banks and other entities that issue payment cards 100.

An interbank network 1300 is a computer network that connects different banking institutions. For example, an Automated Teller Machine (ATM) consortium network is an interbank network.

Figure 2:
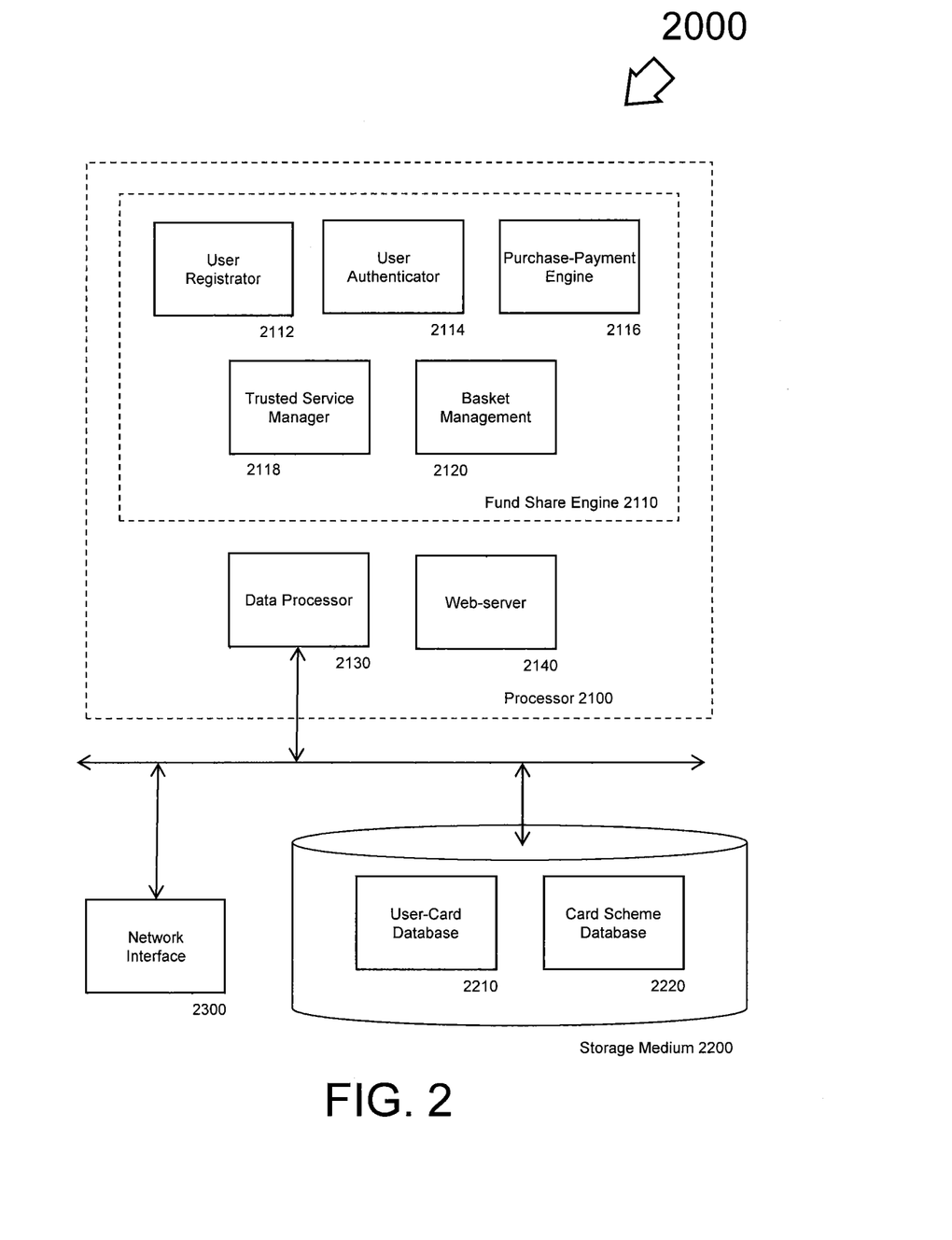
FIG. 2 depicts an apparatus embodiment configured to enable the pooling and sharing of funds to cover expenses.

Embodiments will now be disclosed with reference to a block diagram of an exemplary fund share server 2000 of FIG. 2, constructed and operative in accordance with an embodiment of the present disclosure. Fund share server 2000 is configured enable the pooling and sharing of funds to cover expenses.

Fund share server 2000 may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art.

It is well understood by those in the art, that the elements of FIG. 2 may be implemented as hardware, firmware, or as software instructions and data encoded on a non-transitory computer-readable storage medium 2200.

As shown in FIG. 2, processor 2100 is functionally comprised of a fund share engine 2110, a web-server 2140, and a data processor 2130.

Fund share engine 2110 may further comprise: user registrator 2112, user authenticator 2114, purchase-payment engine 2116, trusted service manager 2118, and basket management 2120. User registrator 2112 enables consumers to register and input their associated payment card information into a user-card database 2210. User authenticator 2114 is an interface that allows users to authenticate themselves with fund share engine 2110. Purchase-payment engine 2116 performs payment and purchase transactions to fund a basket or make payments from a basket. Trusted service manager 2118 provides the fund share engine 2110 secure element provisioning with mobile devices, such as mobile phone 1100a or mobile device 1100b. Basket management 2120 enables the fund share engine 2110 to determine the basket balance, and tracks the contributors to the basket. These structures may be implemented as hardware, firmware, or software encoded on a computer readable medium, such as storage media 2200. Further details of these components are described with their relation to method embodiments below.

In some embodiments, payment-purchase engine 2116 and trusted service manager 2118 may be a service separate from fund share server 2000, and may exist at payment processor 1400 or issuer 1500.

Data processor 2130 interfaces with storage media 2200 and network interface 2300. The data processor 2130 enables processor 2100 to locate data on, read data from, and write data to, these components.

Web-server 2140 is any computing device configured to deliver web pages or other content across the Internet 1200 via network interface 2300; user devices 1100 may communicate with a fund share engine 2110 via the World-Wide-Web protocol and web-server 2140.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows fund share server 2000 to communicate with internet 1200, consumer 1100, consumers using mobile payment devices 1100d-e, interbank network 1300, payment processor 1400, and issuers 1500a-n.

Computer-readable storage media 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage media 2200 may be remotely located from processor 2100, and be connected to processor 2100 via a network such as a local area network (LAN), a wide area network (WAN), or the Internet 1200.

In addition, as shown in FIG. 2, storage media 2200 may also contain a user-card database 2210, and a card scheme database 2220. User-card database 2210 is configured to store information associating users with baskets and payment cards. Users may be individuals, businesses, or other entities. For individual user accounts, users may be associated with one or more baskets. Baskets may accept contributions from multiple individual users through the processes described below. Card scheme database 2220 facilitates the look-up of issuers 1500 as described below.

It is understood by those familiar with the art that one or more of these databases 2210-2220 may be combined in a myriad of combinations. The function of these structures may best be understood with respect to the flowcharts of FIGS. 3-5, as described below.

Figure 3:
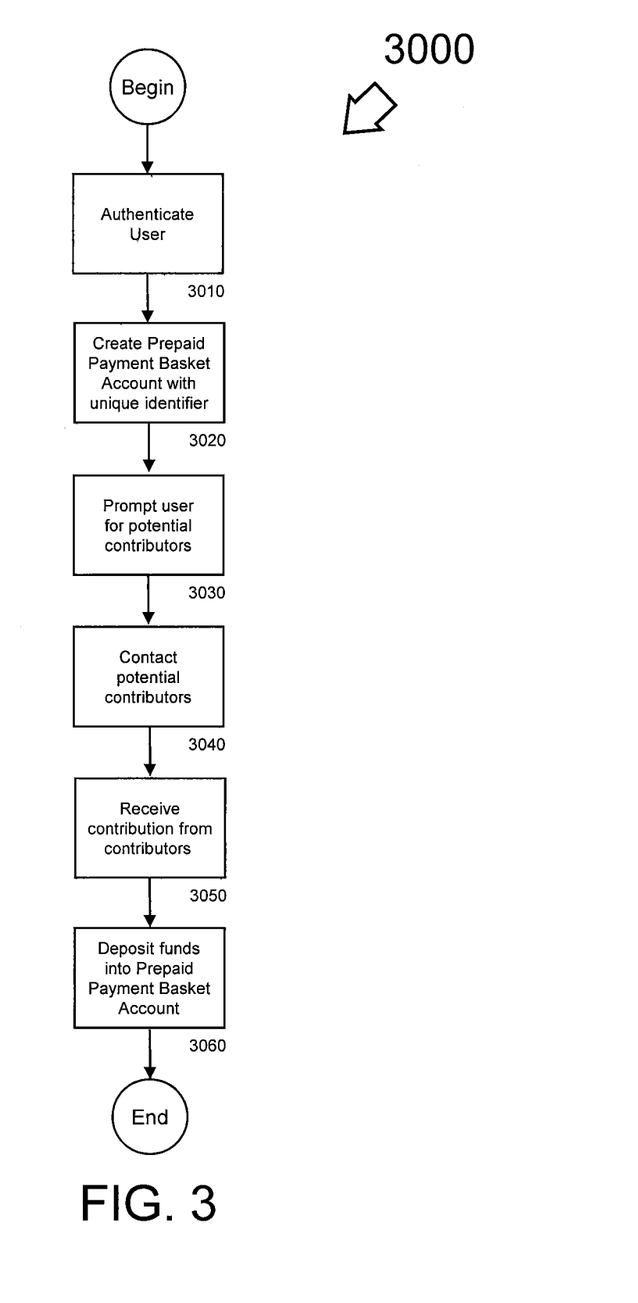
FIG. 3 flowcharts a method embodiment to enable the pooling and sharing of funds to cover expenses.
Figure 4:
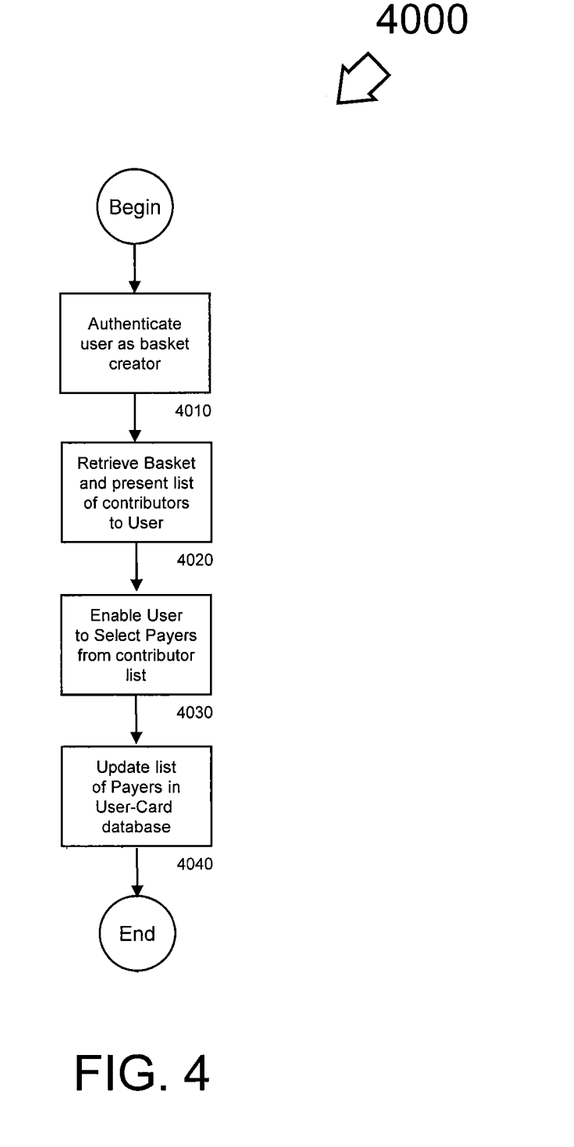
FIG. 4 is a flowchart of an embodiment to enable multiple payers to spend shared funds.
Figure 5:
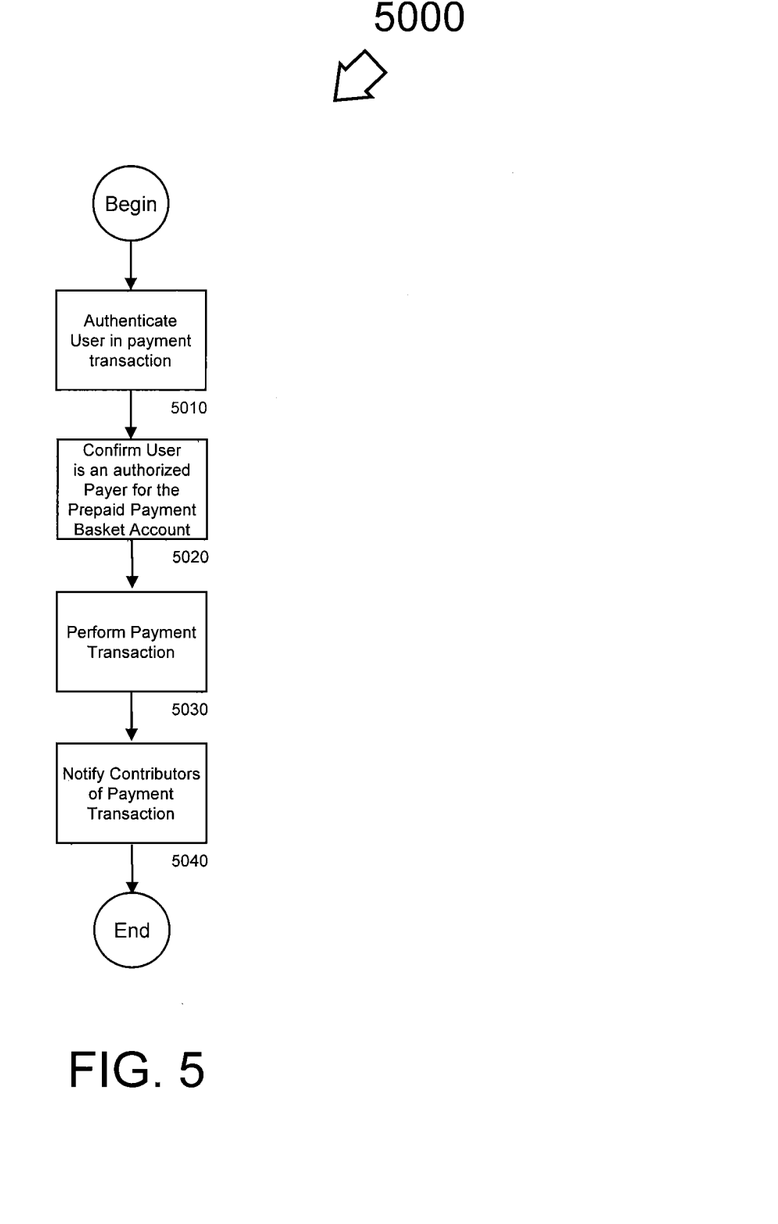
FIG. 5 illustrates a flowchart of an embodiment to enable a payers to spend shared funds and notify contributors of the payment on their behalf.

We now turn our attention to method or process embodiments of the present disclosure, FIGS. 3-5. It is understood by those known in the art that instructions for such method embodiments may be stored on their respective computer-readable memory and executed by their respective processors. It is understood by those skilled in the art that other equivalent implementations can exist without departing from the spirit or claims of the invention.

It is further understood that embodiments of the present disclosure may be applied to a variety of payment card types, including credit, debit, charge, prepaid cards and electronic wallets (subject to any applicable financial regulatory restrictions and requirements). An electronic wallet is a program or service where users can store and control their online shopping information, like logins, passwords, shipping address and payment card details, in one central place.

Some embodiments may be restricted to either prepaid cards or debit cards. Other embodiments allow pooling of funds from one type of payment card to another; for example, a cash advance from a credit card may pooled with funds from a debit card into a basket (subject to any applicable financial regulatory restrictions and requirements).

FIG. 3 flowcharts a method 3000 in which embodiment to enable the pooling and sharing of funds to cover expenses through fund share server 2000, constructed and operative in accordance with an embodiment of the present disclosure. Process 3000 may be referred to as basket creation.

At block 3010, user authenticator 2114 receives information from user 1100 to authenticate the user against data stored in the user-card database 2210. Embodiments may authenticate users using any method known in the art including, but not limited to: passwords, cardkeys, optical recognition, fingerprint identification, and facial recognition.

Basket management 2120 creates a prepaid payment basket account with a unique identifier, block 3020. With such a virtual payment card, a card number uniquely identifies a record in a central database at the card issuer, where the balance is recorded. This unique number is commonly referred to as a Primary Account Number (PAN). As part of the basket account creation at block 3020, basket management 2120 associates the created basket with an issuer 1500. The issuer may be predetermined in advance, or in some embodiments, the user may select an issuer 1500 of their choice.

Additionally, basket management 2120 may also generate ancillary information normally associated with a payment card. Such information may vary, but the most common include: Name of virtual card holder, account number, Expiration date, and a security code (such as a Card Verification Value or "CVV" code). In some instances, the ancillary information associated with the account is predetermined and provided by the issuer and then associated with the account number.

In some embodiments, the user may be prompted to name or attach a descriptive label to the basket. For example, a user may decide to name the basket after the intended fund payment activity, such as "Family trip to Vienna" or "Denise's surprise birthday party expenses."

The basket information is stored at user-card database 2210.

The user is prompted to list contributors for the basket, block 3030. The contributors may be added via a variety of different ways. For example, users may be prompted to add potential contributors via their contacts on the mobile device 1100, via social network contacts, telephone numbers, e-mail addresses or any other electronic identifier known in the art.

At block 3040 fund share engine 2110 contacts all the specified potential contributors requesting their contribution to the basket. If the potential contributor is a known user that has specified a designated contact method in user-card database 2210, fund share engine 2110 contacts the potential contributor via the designated contact method. Contact methods may occur via an application running on mobile device 1100, e-mail, Short Message Service (SMS), text messages, voicemail messages, telephone calls, or any other contact method known in the art.

Note that some embodiments skip blocks 3030 and 3040, and may receive contributions to the basket without making the request. In such embodiments, contributors may look up baskets via their "friends" contacts or from the description label attached to the basket.

At block 3050, purchase-payment engine 2116 processes contributions are received from contributors. Contributors may be able to send contributions in a myriad of ways. Contributors can contribute from their debit card accounts, credit card accounts, electronic funds transfer, or any other electronic method known in the art. In certain embodiments, contributions from credit card accounts, the contribution are considered a cash advance. In alternate embodiments, the contribution from certain types of accounts may have transaction fees attached to cover the overhead of the transaction.

Additionally, when contributions are made, the basket management 2120 associates a record of the contribution (along with the amount, contributor, and contributor contact information) with the basket information in user-card database 2210.

Purchase-payment engine 2116 deposits contributions into the basket at block 3060, and process 3000 ends. Contributions may be considered as a deposit made to the balance of a virtual prepaid paid card.

Initially, in the process described above, the user from the basket creation process 3000 defaults to being a person authorized to spend contributed funds from the basket, which will henceforth be referred to as a "payer." Additionally, it is assumed that contributors are not always authorized to spend the contributed funds. More likely, the default is more likely that contributors are not allowed to spend contributed funds. Moving to FIG. 4, method 4000 enables the basket creator to designate multiple payers to spend shared funds, constructed and operative in accordance with an embodiment of the present disclosure. It is understood by those familiar with the art that in some embodiments, payers are designated by the basket creator from the set of contributors. In other embodiments, payers are contributors at all, but trusted individuals. In yet another embodiment, some or all contributors are automatically payers.

At block 4010, user authenticator 2114 receives information from basket creator 1100 to authenticate the user against basket data stored in the user-card database 2210. Similar to block 3010 above, embodiments may authenticate users using any method known in the art including, but not limited to: passwords, cardkeys, optical recognition, fingerprint identification, and facial recognition.

The basket management 2120 retrieves the basket information from user-card database 2210, including a contributor list which is presented to the authenticated basket creator, block 4020

Fund share engine 2110 enables the basket creator to select payers from the contributor list, block 4030. In some embodiments, the basket creator may authorize payers from other lists, which include non-contributors.

Once the payers are selected, an updated list of payers associated with the basket is recorded in the user-card database 2210, block 4040. Fund share engine 2110 contacts all the specified potential contributors requesting their contribution to the basket. If the newly authorized payer has specified a contact method in user-card database 2210, fund share engine 2110 alerts the newly authorized payers via their designated contact method. Contact methods may occur via an application running on mobile device 1100, e-mail, Short Message Service (SMS), text messages, voicemail messages, telephone calls, or any other contact method known in the art.

When contributors pool funds for a purpose, they expect that their money is used wisely; process 5000 in FIG. 5 illustrates an embodiment to notify contributors of a payment made on their behalf, constructed and operative in accordance with an embodiment of the present disclosure.

At block 5010, user authenticator 2114 receives information to authenticate the payer against basket data stored in the user-card database 2210. Similar to blocks 3010 and 4010 above, embodiments may authenticate users using any method known in the art including, but not limited to: passwords, cardkeys, optical recognition, fingerprint identification, and facial recognition.

The basket management 2120 confirms that the user is an authorized payer for the basket at block 5020.

The payment transaction is performed by purchase-payment engine 2116 at block 5030.

Once the payment is completed, the list of contributors associated with the basket are informed about the payment transaction, block 5040. Fund share engine 2110 alerts the contributors via their designated contact method. Contact methods may occur via an application running on mobile device 1100, e-mail, Short Message Service (SMS), text messages, voicemail messages, telephone calls, or any other contact method known in the art.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method comprising:
   creating an electronic basket, with a processor, the electronic basket comprising a virtual prepaid payment card with a unique identifier and associated with a user;
   prompting a user, via a user-interface, for potential contributors to the electronic basket;
   electronically contacting the potential contributors via a network interface;
   associating the user as a payer to spend from the electronic basket in the user-card database;
   storing the electronic basket in a user-card database on a non-transitory computer-readable storage medium;
   prompting the user to authorize an additional payer to spend from the electronic basket wherein the additional payer is selected from a list of potential contributors that have contributed to the electronic basket;

associating the additional payer with the electronic basket in the user-card database.

2. The method of claim 1, further comprising:

electronically receiving a contribution from the potential contributor via the network interface.

3. The method of claim 2, further comprising:

noting the potential contributor has contributed a contribution to the electronic basket in the user-card database.

4. The method of claim 3, further comprising:

depositing funds associated with the contribution from the potential contributor into the electronic basket.

5. The method of claim 4, wherein the funds deposited is less than or equal to the contribution.

6. The method of claim 5, wherein a processor enables the user to spend an amount from the electronic basket.

7. The method of claim 6, wherein virtual prepaid payment card is associated with a predetermined issuer.

8. The method of claim 6, wherein the user is prompted to select an issuer associated with virtual prepaid payment card.

9. The method of claim 1, further comprising:

informing the additional payer of the authorization to spend from the electronic basket via the network interface.

10. The method of claim 9, wherein the informing occurs by an application running on mobile device, electronic mail, text message, or automated telephone call.

11. An apparatus comprising:

a processor configured to create an electronic basket, the electronic basket comprising a virtual prepaid payment card with a unique identifier and associated with a user, the processor further configured to authorize the user as a payer to spend from the electronic basket, to prompt a user for potential contributors to the electronic basket, and to prompt the user to authorize an additional payer to spend from the electronic basket, wherein the additional payer is selected from a list of potential contributors that have contributed to the electronic basket;

a network interface configured to electronically contact the potential contributors; and a database configured to store the electronic basket, associating the additional payer with the electronic basket.

12. The apparatus of claim 11, wherein the network interface is further configured to receive a contribution from the potential contributor.

13. The apparatus of claim 12, wherein the processor is further configured to note the potential contributor has contributed a contribution to the electronic basket in the database.

14. The apparatus of claim 13, wherein the processor is further configured to deposit funds associated with the contribution from the potential contributor into the electronic basket.

15. The apparatus of claim 14, wherein the funds deposited is less than or equal to the contribution.

16. The apparatus of claim 15, wherein the processor enables the user to spend an amount from the electronic basket.

17. The apparatus of claim 16, wherein virtual prepaid payment card is associated with a predetermined issuer.

18. The apparatus of claim 16, wherein the user is prompted to select an issuer associated with virtual prepaid payment card.

19. A non-transitory computer readable medium encoded with data and instructions, when executed by a computing device the instructions causing the computing device to:

create an electronic basket, the electronic basket comprising a virtual prepaid payment card with a unique identifier and associated with a user, the user being authorized as a payer to spend from the electronic basket;

prompt a user for potential contributors to the electronic basket;

electronically contact the potential contributors via a network interface;

store the electronic basket in a user-card database;

prompt the user to authorize an additional payer to spend from the electronic basket wherein the additional payer is selected from a list of potential contributors that have contributed to the electronic basket; and associate the additional payer with the electronic basket in the user-card database.

20. The non-transitory computer readable medium of claim 19, further comprising, the instructions further causing the computing device to:

electronically receive a contribution from the potential contributor via the network interface.

21. The non-transitory computer readable medium of claim 20, further comprising, the instructions further causing the computing device to:

note the potential contributor has contributed a contribution to the electronic basket in the user-card database.

* * * * *